United States Patent
Ehrentraut

(10) Patent No.: US 9,392,580 B2
(45) Date of Patent: Jul. 12, 2016

(54) CIRCUIT ARRANGEMENT FOR A MOBILE COMMUNICATIONS UNIT OF A MOTOR VEHICLE, METHOD FOR OPERATING THE MOBILE COMMUNICATIONS UNIT AND CHIP CARD FOR THE MOBILE COMMUNICATIONS UNIT

(71) Applicant: AUDI AG, Ingolstadt (DE)

(72) Inventor: Herbert Ehrentraut, Beilngries (DE)

(73) Assignee: AUDI AG, Ingolstadt (DE)

( * ) Notice: Subject to any disclaimer, the term of this patent is extended or adjusted under 35 U.S.C. 154(b) by 0 days.

(21) Appl. No.: 14/415,955

(22) PCT Filed: Jul. 9, 2013

(86) PCT No.: PCT/EP2013/002014
§ 371 (c)(1),
(2) Date: Jan. 20, 2015

(87) PCT Pub. No.: WO2014/015946
PCT Pub. Date: Jan. 30, 2014

(65) Prior Publication Data
US 2015/0173046 A1  Jun. 18, 2015

(30) Foreign Application Priority Data
Jul. 21, 2012  (DE) .......................... 10 2012 014 549

(51) Int. Cl.
*H04W 4/00* (2009.01)
*H04W 72/04* (2009.01)
(Continued)

(52) U.S. Cl.
CPC ............... *H04W 72/04* (2013.01); *H04L 67/12* (2013.01); *H04W 12/06* (2013.01); *H04W 60/005* (2013.01); *H04W 88/06* (2013.01); *H04W 84/005* (2013.01)

(58) Field of Classification Search
None
See application file for complete search history.

(56) References Cited

U.S. PATENT DOCUMENTS

| 2003/0181216 A1 | 9/2003 | Tsai et al. |
| 2009/0186651 A1 | 7/2009 | You |
| 2012/0046003 A1 * | 2/2012 | Ying ...................... H04B 1/406 455/90.2 |

FOREIGN PATENT DOCUMENTS

| DE | 198 23 074 A1 | 11/1999 |
| DE | 600 30 687 T2 | 10/2007 |
| GB | 2436015 | * 9/2007 |

(Continued)

OTHER PUBLICATIONS

International Search Report issued by the European Patent Office in International Application PCT/EP2013/002014.

*Primary Examiner* — Afshawn Towfighi
(74) *Attorney, Agent, or Firm* — Henry M. Feiereisen LLC

(57) ABSTRACT

A circuit arrangement for a mobile communications unit of a motor vehicle, having a first mobile communications module for a mobile communications transmission according to a first mobile communications standard, a second mobile communications module for a mobile communications transmission according to a second mobile communications standard and a reading unit for reading identification data from a chip card. For a reliable mobile communications connection, both for telephony and for the transmission of other digital data using control devices and personal computers, the circuit arrangement is configured to operate the two mobile communications modules simultaneously, and the reading unit is configured for the simultaneous operation of the two mobile communications modules to receive identification data from two subscriber identification modules from the same chip card and to transmit the identification data of a respective subscriber identification module to one of the two mobile communications modules.

5 Claims, 1 Drawing Sheet

(51) Int. Cl.
*H04W 12/06* (2009.01)
*H04W 60/00* (2009.01)
*H04W 88/06* (2009.01)
*H04L 29/08* (2006.01)
*H04W 84/00* (2009.01)

(56) References Cited

FOREIGN PATENT DOCUMENTS

GB 2481702 A 1/2014
WO WO 01/43460 A2 6/2001

* cited by examiner

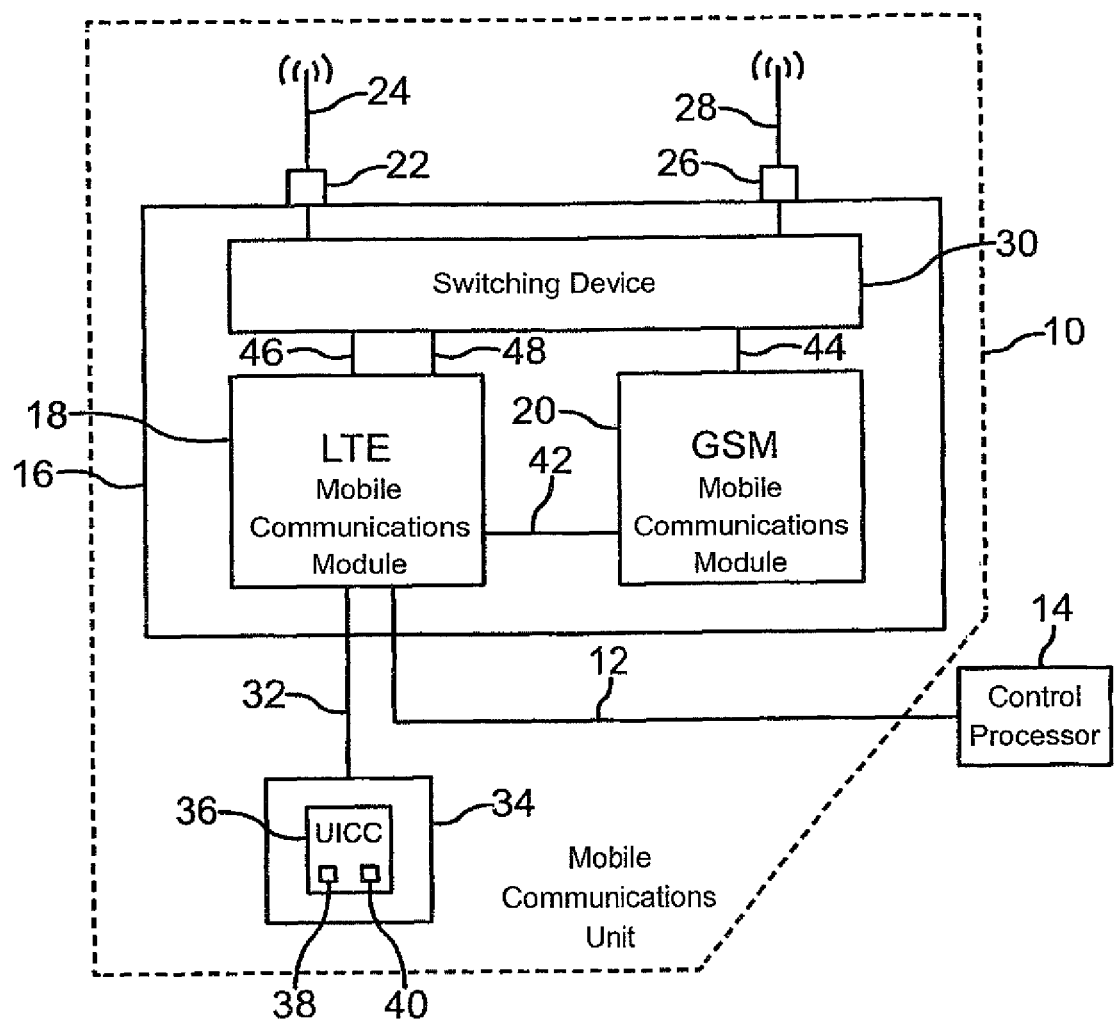

CIRCUIT ARRANGEMENT FOR A MOBILE COMMUNICATIONS UNIT OF A MOTOR VEHICLE, METHOD FOR OPERATING THE MOBILE COMMUNICATIONS UNIT AND CHIP CARD FOR THE MOBILE COMMUNICATIONS UNIT

CROSS-REFERENCES TO RELATED APPLICATIONS

This application is the U.S. National Stage of International Application No. PCT/EP2013/002014, filed Jul. 9, 2013, which designated the United States and has been published as International Publication No. WO 2008/031536 and which claims the priority of German Patent Application, Serial No. 10 2012 014 549.7, filed Jul. 21, 2012, pursuant to 35 U.S.C. 119(a)-(d).

BACKGROUND OF THE INVENTION

The invention relates to a circuit arrangement for a mobile communications unit of a motor vehicle. The circuit arrangement has two mobile communications modules, wherein a mobile communications transmission is enabled on each of the mobile communications modules according to a predetermined mobile communications standard. The circuit arrangement further includes a reading unit for reading identification data from a chip card. In the context of the invention, a chip card refers to a UICC (Universal Integrated Circuit Card—universal card with an integrated circuit). Another term for such UICC is "SIM card" (SIM—Subscriber Identification Module). The present invention also relates to a method of operating a mobile communications unit having the described circuit arrangement as well as a UICC, i.e, a chip card, in which a Subscriber Identification Module (SIM) is integrated.

A mobile communications unit (Mobile Equipment) of a type that is integrated for example in a smartphone typically includes a mobile communications module for setting up a mobile communications connection in a mobile communications network via a wireless interface. In the context of the invention, a mobile communications module is the particular circuit unit which converts between digital payload data to be transmitted over the wireless connection and an analog mobile radio signal that can then be emitted via antennas. Mobile communications modules are commercially available under the designation GSM module (GSM—Global System for Mobile Communications), UMTS module (UMTS—Universal Mobile Telecommunications System) and LTE module (LTE—Long Term Evolution).

To enable a mobile communications unit to receive incoming calls or to set up calls, the mobile communications unit must be registered with a mobile radio network. This requires a SIM in the mobile communications unit. The SIM is a small processor with a memory, by which the mobile communications unit is assigned to a network and authenticated. For this purpose, secret numbers and algorithms are stored on the SIM. In connection with the mobile communications networks, UMTS and LTE, the SIM is also referred to as USIM.

Simultaneous transmission of voice and data is currently possible only with the UMTS mobile communications standard. The method defined in the GSM standard for the simultaneous transmission of voice and data is only scarcely supported by current GSM networks. LTE mobile communications networks currently do not support voice transmission and instead resort to an older standard UMTS or GSM for transmitting voice. Currently, only the GSM standard is supported in many regions. If only a single wireless module is used, the data transmission is interrupted when voice is transmitted.

The mobile communications unit may include two mobile communications modules to set up a data connection with the first mobile communications module and a voice connection with the second mobile communications module in a situation where the existing mobile communications standard does not allow a simultaneous transmission of voice and data. According to the current state of the art, two SIM cards are required for the simultaneous operation of the two mobile communications modules.

It can be expected in connection with the introduction of the mobile communications standard LTE that new problems with mobile coverage will arise when the new mobile communications standard is introduced. This may lead to coverage gaps which do not depend on the area, but on the services. The LTE mobile communications networks currently do not support the standard VoLTE proposed by LTE for voice transmission. It is therefore not predictable, how robust telephone connections will be. As taught by experience, the implementation of LTE and similar, novel communications standards in a vehicle will therefore likely encounter technical difficulties, so that it is desirable to have a redundant solution or a fallback position.

SUMMARY OF THE INVENTION

It is the object of the present invention to provide in a motor vehicle a reliable wireless connection for the transmission of both voice and other digital data by control devices and personal computers by using inexpensive circuitry.

The object is attained by a circuit arrangement for a mobile communications unit of a motor vehicle having a first mobile communications module for a mobile radio transmission according to a first mobile communications standard, a second mobile communications module for a mobile radio transmission according to a second mobile communications standard, a reading unit for reading identification data from a chip card, wherein the circuit arrangement is configured to operate the first and second mobile communications modules simultaneously, wherein the reading unit is configured to receive from the chip card for simultaneous operation of the first and second mobile communications modules identification data from two subscriber identification modules and to transmit in each case the identification data of a subscriber identification module to a respective one of the first and second mobile communications modules, and an antenna assembly having a primary antenna and a secondary antenna, and a switching device configured to electrically couple the first mobile communications module with the primary antenna and the secondary antenna and to electrically couple the second mobile communications module with the secondary antenna if the second mobile communications module, although it is registered with a second mobile communications network, has not yet established an active connection to the second mobile communications network, and to electrically couple the first mobile communications module with the secondary antenna and the second mobile communications module with the primary antenna, if the second mobile communications module is registered and sets up an active connection.

The circuit arrangement according to the invention is part of a mobile communications unit of a motor vehicle. It has a first mobile communications module for wireless transmission according to a first mobile communications standard, preferably UMTS or LTE simultaneously with GSM, and a second mobile communications module for wireless transmission according to a second mobile communications standard, preferably GSM. The circuit arrangement further includes a reading unit for reading identification data from a chip card, i.e. a UICC. In particular, the identification data are data generated by SIMs.

The circuit arrangement according to the invention is now configured to operate the two mobile communications modules. To this end, to operate two mobile communications modules simultaneously, the reading unit is designed to receive from the chip card identification data, in particular IMSIs, from two subscriber identification modules (SIM) and to transmit the identification data from a respective subscriber identification module to a corresponding one of the two mobile communications modules.

According to the method of the invention, when operating a mobile communications unit of a motor vehicle, the mobile communications unit is registered via two mobile communications modules at the same time. For this purpose, the mobile communications unit is registered in a mobile communications network both via its first mobile communications module and via its second mobile communications module. This is done based on the identification data of two subscriber identification modules. The condition "registered" means here that the respective mobile communications module has successfully performed, in a conventional manner, the registration procedure to register the mobile communications unit in a cell of the respective mobile radio network and that the mobile communications module can thus at any time set up a call or receive a call via the mobile communications network. The state of being registered further includes the time period during which the mobile communications module is actively transmitting or receiving data, either in the context of telephony or of another type of transmission of useful data. With the method according to the invention, the mobile communications unit is registered in the respective mobile communications networks by both mobile communications modules based on identification data of different subscriber modules (SIM), i.e. in particular different IMSI. However, the first and the second mobile communications network may be one and the same mobile communications network or may be two different mobile communications networks. The realization of the invention is thus independent of the choice of the standard of the first mobile communications module and the second mobile communications module.

The circuit arrangement according to the invention and the method according to the invention have the advantage that a user of the motor vehicle can establish a mobile communications connection with the appropriate mobile communications unit by using the respective suitable mobile communications module, when the user wants to surf the Internet, for example with a computer, while at the same time also wanting to call or receive phone calls. While data are advantageously exchanged via the Internet in the context of Internet surfing by using an LTE module, it may be advantageous to set up telephone connections exclusively via a GSM module. This may be advisable, for example, to avoid the aforementioned problems. However, this does not require disabling the LTE module in the switching arrangement according to the invention. During the operation of a telephone (GSM), the data can hence still be exchanged via the Internet for example, via a LTE connection instead of via the relatively narrow-band GSM standard.

The circuit arrangement according to the invention has here the additional advantage that a user of the mobile communications unit does not need two SIM cards for operating the mobile communications unit, because the reading unit is designed to read the identification data from a single UICC.

According to another aspect of the invention, in this context, a chip card for insertion into an embodiment of the circuit arrangement according to the invention is provided. This chip card has two subscriber identification modules (SIM). The chip card according to the invention is in this case significantly different from similar chip cards known from the prior art, for example in connection with the mobile communications service "DuoBill" from the company Vodafone. These conventional chip cards are designed to output two different IMSI to a single mobile communications module, depending on whether a private phone call or a business phone call is desired. For this purpose, such chip card may have two SIM of which, however, only one can be actively operated at any given time.

In contrast, the chip card according to present the invention is designed to provide identification data for two simultaneously registered mobile communications modules, whereby identification data for the first mobile communications module are outputted using a first subscriber identification module and identification data for the second mobile communications module are outputted using the second subscriber identification module. Hence, the issue here is not to provide two SIM for one and the same mobile communications module, but to also operate two mobile communications modules simultaneously with a single chip card. For using the chip card according to the invention, the method according to the invention is further developed in that the identification data are received from one and the same chip card, on which these two subscriber identification modules are provided.

Preferably, the chip card according to the invention has in this case a connection which is adapted to output the identification data from both subscriber identification modules to an external device via the same electrical contacts. The chip card can thus have the traditional connector known from a SIM card, so that the chip card according to the invention can also be used in conventional devices.

In the following, further advantageous embodiments of the circuit arrangement according to the invention will be described.

In one embodiment, the second mobile communications module is only indirectly coupled with the reading unit for the data transfer via the first mobile communications module. The first mobile communications module is suitably configured to receive from the reading unit the identification information for the second mobile communications module and to transmit these to the second mobile communications module. With this embodiment of the circuit arrangement, the number of electrical connecting lines leading to reading unit does not have to be greater than in a circuit arrangement that has only a single mobile communications module. This is particularly advantageous when the reading unit, on the one hand, and the mobile communications modules, on the other hand, is located on different plug-in circuit boards. This is for example the case when the two mobile communications modules are arranged on a plug-in board to be inserted into a slot of a base board to which the reading unit is connected.

Preferably, the first mobile communications module is coupled to the reading unit via a USB (USB—Universal Serial Bus). The identification data for the second mobile communications module can then advantageously be transmitted from the reading unit to the first mobile communications module via a single serial line, from where they can then be routed onward.

Advanced mobile communications modules, such as an LTE-module, are able to use two or more antennas simultaneously for reception, which is also referred to as antenna diversity. In this context, the circuit arrangement according to the invention has preferably an antenna assembly which includes a primary antenna and a secondary antenna. The term primary antenna refers here to an antenna with a transmission and reception characteristic that is more favorable than that of the secondary antenna. Specifically, the primary antenna has a lower directivity than the secondary antenna, meaning that wireless signals can be transmitted and received in a horizontal plane in more directions with the primary antenna than with the secondary antenna without significant attenuation. This is for example the case, when the primary antenna is installed on a roof of the motor vehicle and the secondary antenna in a bumper. The circuit arrangement with the primary antenna and the secondary antenna further includes a switching device which is configured to alternatingly connect the two mobile communications modules with the primary antenna. If the second mobile communications module is in fact registered in its dedicated mobile communications network, but no active transmission (i.e. no user data transmission) is set up to the second mobile communications network, then the switching device connects the first mobile communications module to the primary antenna and the second mobile communications module only to the secondary antenna. For using the antenna diversity, both the primary antenna and also (via a further electrical connection) the secondary antenna is connected with the first mobile communications module. Meanwhile, the second mobile communications module can receive via the secondary antenna control data from a mobile communications station.

If the second mobile communications module is registered and then also sets up an active connection, then the switching device connects the first module to the secondary antenna and the second mobile communications module to the primary antenna. The second mobile module is then able to use the more favorable antenna characteristics of the primary antenna while the first mobile communications module continues to receive or transmit via the secondary antenna. If the second mobile communications module is a GSM module, a robust telephony can be provided, while during the same time uninterrupted data traffic is enabled via the first mobile communications module (for example, an LIE module).

The circuit arrangement according to the invention may, of course, also include more than two mobile communications modules, and also more than two antennas.

BRIEF DESCRIPTION OF THE DRAWING

The invention will now be explained again in more detail with reference to a concrete embodiment illustrated in the drawing, which shows in:

FIG. 1 a schematic block diagram of a preferred embodiment of the circuit arrangement according to the invention.

DETAILED DESCRIPTION OF PREFERRED EMBODIMENTS

In the example discussed below, the described components of the circuit arrangement each represent individual features of the invention to be considered independently of each other, which also further develop the invention independent of each other and which therefore should be viewed to form part of the invention individually or in a combination that is different from the illustrated combination. Furthermore, the described embodiment can be supplemented by other of the previously described features of the invention.

FIG. 1 shows a mobile communications unit 10, which can be connected via one or more communication lines 12 to a control processor 14 that exchanges via the mobile communications unit 10 voice data for a telephone call as well as other useful digital data, for example via an Internet connection, with one or more unillustrated) mobile communications networks. The control processor 14 may be, for example, a control processor of an infotainment system, which may include a telephone set and/or a personal computer or which may be connected to a telephone set and/or a personal computer.

The mobile communications unit includes a plug-in card 16, on which a first mobile communications module 18, here for example an LTE-module, and a second mobile communications module 20, here for example a GSM module, are arranged. A primary antenna 24 is connected to a primary antenna terminal 22 and a secondary antenna 26 is connected to a secondary antenna terminal 28. The primary antenna 24 may for example be arranged on a roof of the motor vehicle and the secondary antenna 28 for example in a bumper. The antenna terminals 22, 26 are connected to the two mobile communications modules 18, 20 via a switching device 30. The first mobile communications module 18 is connected via a data line 32 to a reading unit 34, which has a slot with a chip card 36, i.e. a UICC. The chip card 36 has two SIM 38, 40. The SIM 38 is configured to operate the first mobile communications module 18, whereas the second SIM 40 is configured to operate the second mobile communications module 20. The second mobile communications module 20 is indirectly coupled with the reading unit 34 via the first mobile communications module 18. For this purpose, the first and the second mobile communications module 8, 20 are electrically connected with one another via coupling cables 42.

The LTE module 18 may be connected to the control processor 14 via a USB. The lines of the USB are then implemented by the communication lines 12. The control of control processor 14 for the GSM module 20 is looped through the LTE module 18 or, if necessary, influenced the LTE module 18. The LTE module 18 may also independently control the GSM module 20.

Both mobile modules 18, 20 share the two antennas 24, 28. The primary antenna 24 has better reception properties than the secondary antenna 28. The primary antenna is connected to the LTE module 18 or the GSM module 20 as needed. This is performed by respective switches 30 of the switching device. During a telephone call, the primary antenna 24 is switched to the GSM module 20. For this purpose, the primary antenna terminal 22 is electrically connected via an (unillustrated) switch to a signal terminal 44 of the second mobile communications module 20. In this switching state of the switching device 30, both a transmitting and receiving signal terminal 46 and a secondary receiving terminal 48 of the first mobile communications module 18 are electrically coupled to the secondary antenna terminal 26 via the switching device 30. Preferably, the GSM module 20 controls the switching logic of the antennas, i.e. the switching device 30.

For simultaneous use of the LTE module 18 and GSM-module 20, a respective dedicated SIM card should actually be provided. However, in the mobile communications unit 10, the two SIM fields 38, 40 are provided on the same chip card 36. Preferably, the chip card 36 is connected to the LTE module 18 via a standard SIM card interface, for example a USB. The identification data from the second SIM 40 are looped through the LTE module 18 and from there to the GSM module 20.

With the present invention, only a single chip card 36 is required to simultaneously operate two mobile modules 18, 20.

What is claimed is:

1. A circuit arrangement for a mobile communications unit of a motor vehicle, comprising:
- a first mobile communications module for a mobile radio transmission according to a first mobile communications standard,
- a second mobile communications module for a mobile radio transmission according to a second mobile communications standard,
- a reading unit for reading identification data from a chip card,
- wherein the circuit arrangement is configured to operate the first and second mobile communications modules simultaneously,
- wherein the reading unit is configured to receive from the chip card for simultaneous operation of the first and second mobile communications modules identification data from two subscriber identification modules and to transmit in each case the identification data of a subscriber identification module to a respective one of the first and second mobile communications modules, and
- an antenna assembly having a primary antenna and a secondary antenna, and
- a switching device configured to
- electrically couple the first mobile communications module with the primary antenna and the secondary antenna and to electrically couple the second mobile communications module with the secondary antenna if the second mobile communications module, although it is registered with a second mobile communications network, has not yet established an active connection to the second mobile communications network, and to electrically couple the first mobile communications module with the secondary antenna and the second mobile communications module with the primary antenna, if the second mobile communications module is registered and sets up an active connection.

2. The circuit arrangement of claim 1, wherein the second mobile communications module is coupled with the reading unit only indirectly via the first mobile communications module for data transmission, and wherein the first mobile communications module is configured to receive the identification data for the second mobile module from the reading unit and forward the identification data to the second mobile communications module.

3. The circuit arrangement of claim 1, wherein the first mobile communications module is coupled to the reading unit via a USB.

4. The circuit arrangement of claim 1, wherein the first mobile communications standard is a standard selected from UMTS, LTE and GSM, and the second mobile communications standard is GSM.

5. The circuit arrangement of claim 1, wherein the mobile communications unit is configured to transmit voice data via a wireless connection of the second mobile communications module and to transmit other user data via a wireless connection of the first mobile communications module.

* * * * *